Figure 1:
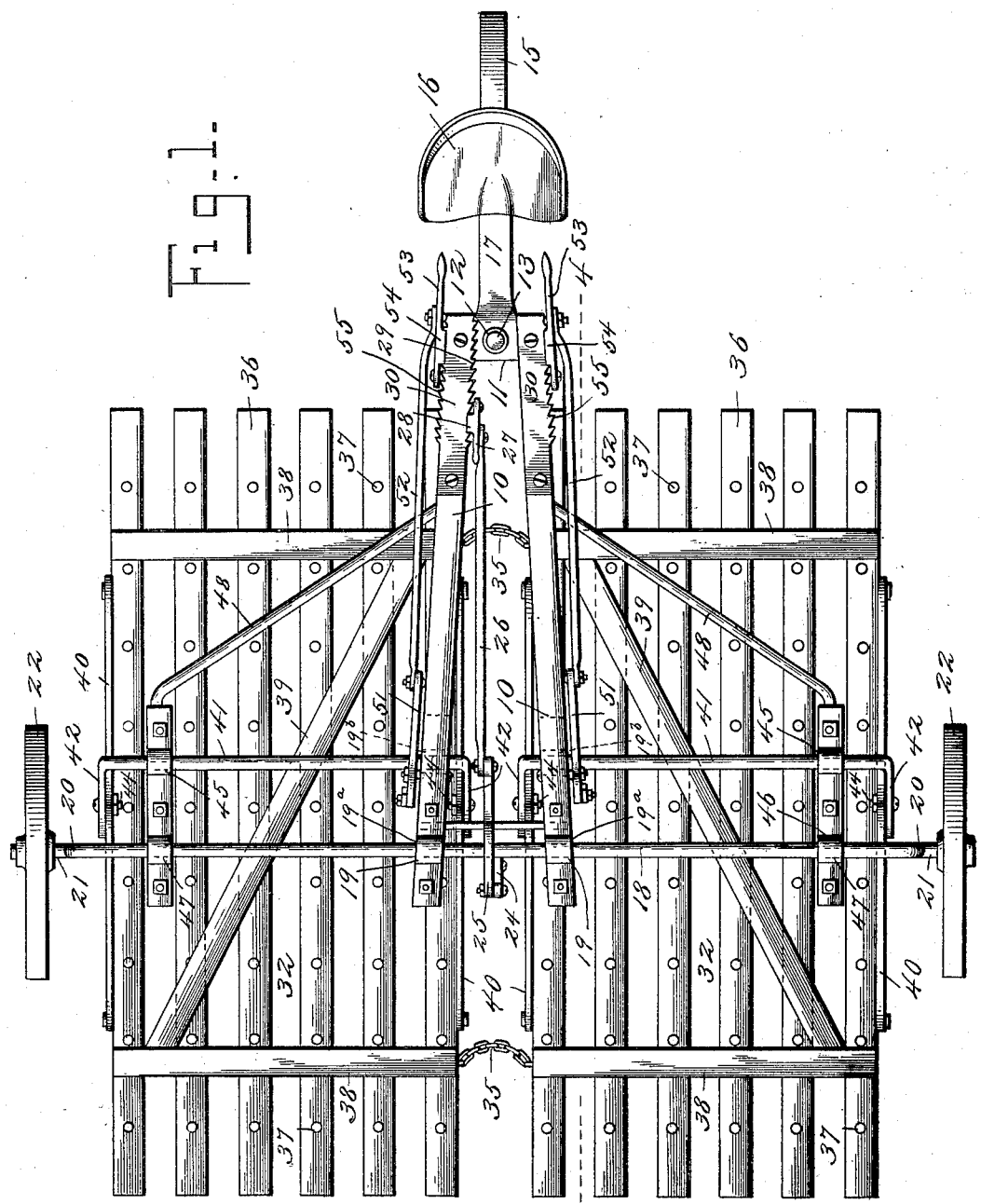

No. 707,902. Patented Aug. 26, 1902.
P. B. CHRISTENSEN.
SULKY HARROW.
(Application filed Nov. 20, 1901.)

(No Model.) 3 Sheets—Sheet 1.

Witnesses
H. L. Ames.
Chas. S. Hyer.

Inventor
Paul B. Christensen
By Victor J. Evans
Attorney

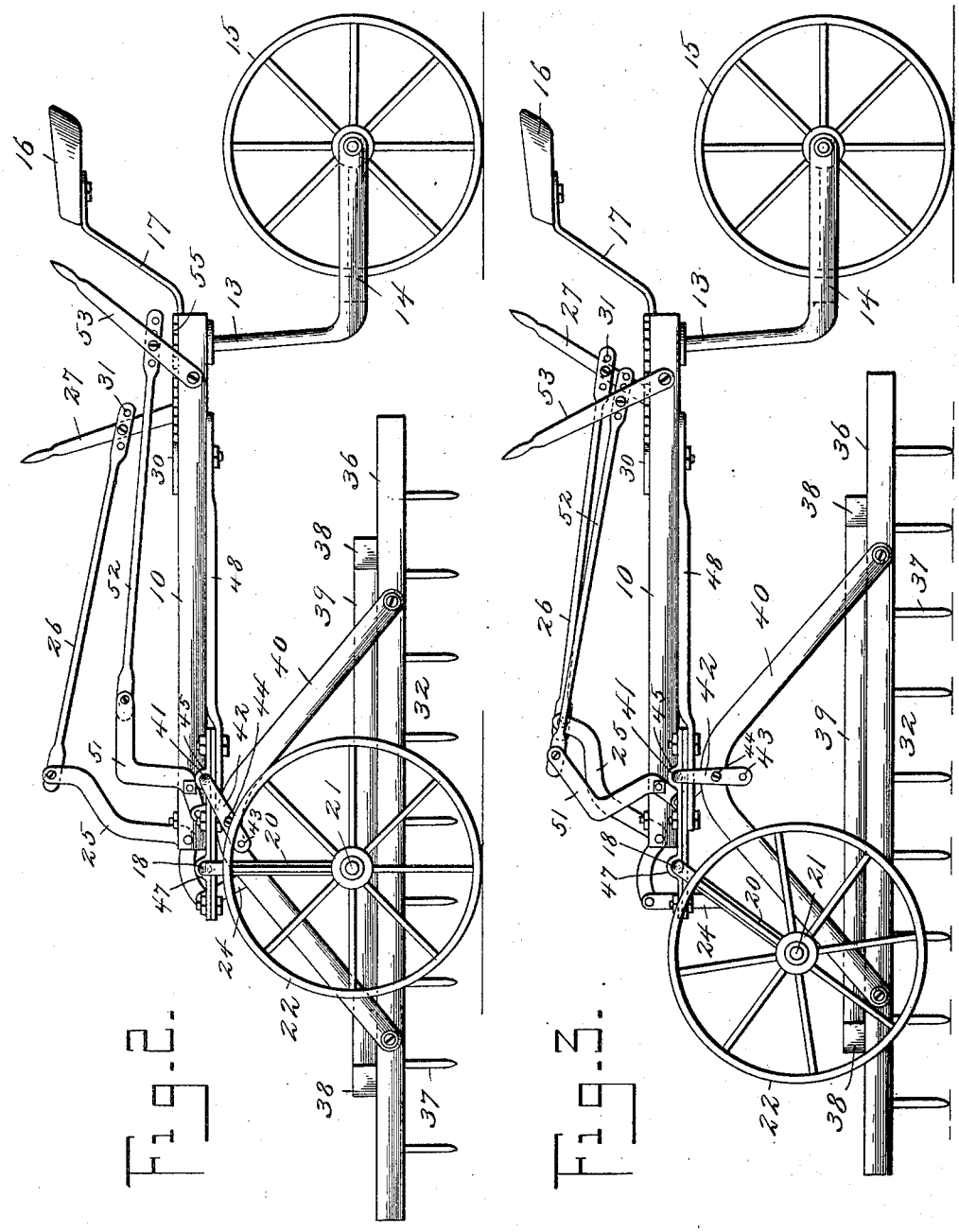

No. 707,902. Patented Aug. 26, 1902.
P. B. CHRISTENSEN.
SULKY HARROW.
(Application filed Nov. 20, 1901.)
(No Model.) 3 Sheets—Sheet 3.
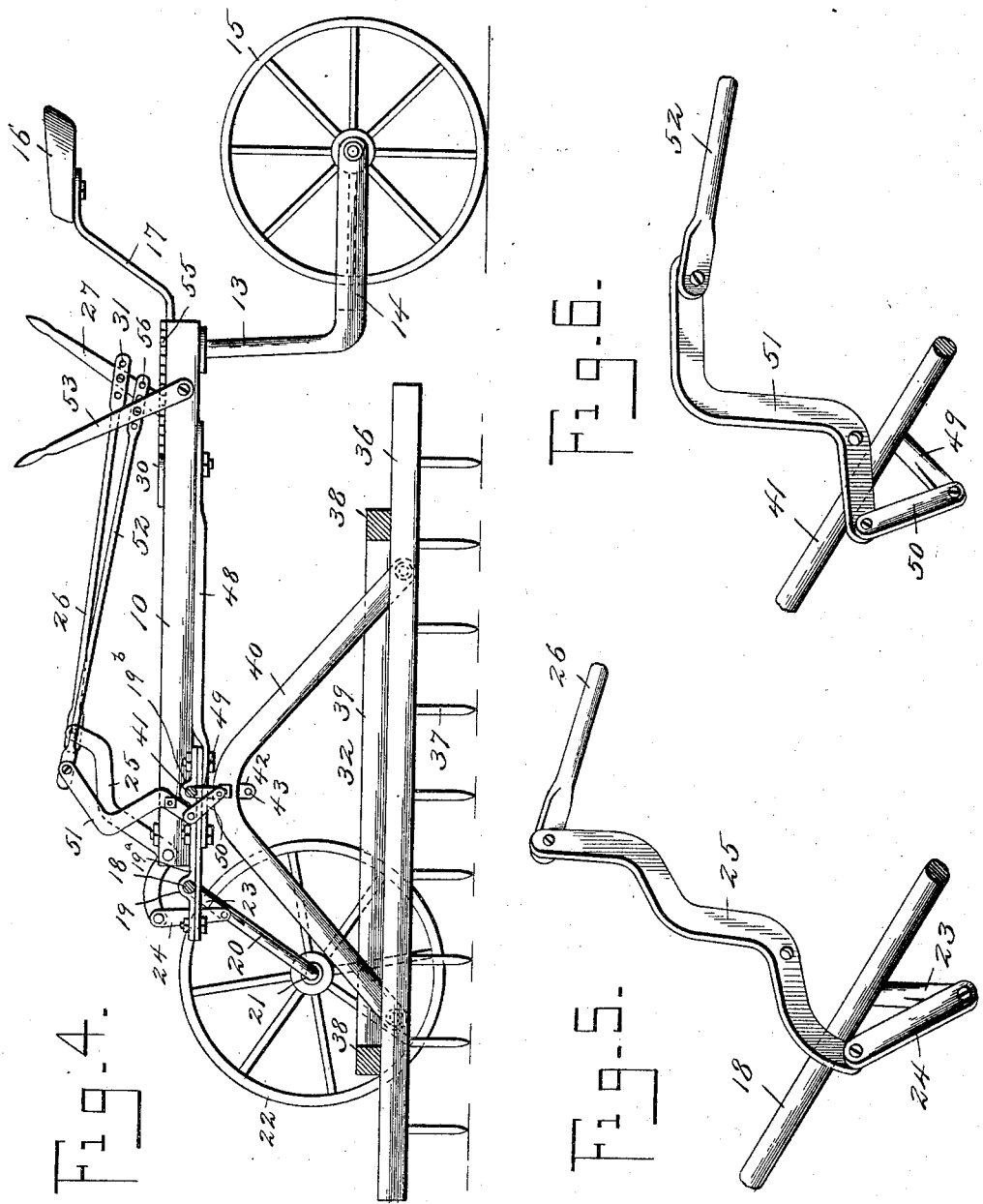
Witnesses
H. L. Amer.
Chas. S. Hyer.
Inventor
Paul B. Christensen
By Victor J. Evans
Attorney

UNITED STATES PATENT OFFICE.

PAUL B. CHRISTENSEN, OF SPRECKELS, CALIFORNIA.

SULKY-HARROW.

SPECIFICATION forming part of Letters Patent No. 707,902, dated August 26, 1902.

Application filed November 20, 1901. Serial No. 83,038. (No model.)

*To all whom it may concern:*

Be it known that I, PAUL B. CHRISTENSEN, a citizen of the United States, residing at Spreckels, in the county of Monterey and State of California, have invented new and useful Improvements in Sulky-Harrows, of which the following is a specification.

This invention relates to sulky-harrows, and has for its object to provide a double or gang harrow employing, in connection with a suitable main frame, a plurality of harrow-sections, which are independently mounted with respect to the main frame and combined with suitable operating mechanism under the control of the driver, whereby the harrow-sections may be independently adjusted, elevated, or depressed without affecting other sections. In associating the harrow-adjusting mechanism with the main frame and carrying-wheels provision is made whereby the harrow-sections may be raised and the carrying-wheels simultaneously depressed, thus adapting the harrow as a whole to be drawn from place to place by the draft-animals, the teeth of the harrow-sections being held at a sufficient distance above the ground to prevent the same from catching in the soil and undergrowth. Incidental to the construction referred to the lifting or tilting of the harrows by hand to remove weeds and clods is rendered unnecessary, as the teeth will clear themselves when elevated sufficiently by the adjusting mechanism.

With the above and other objects in view the invention consists in the novel construction, combination, and arrangement of parts hereinafter fully described, illustrated, and claimed.

In the accompanying drawings, Figure 1 is a plan view of a sulky-harrow constructed in accordance with the present invention. Fig. 2 is a side elevation of the same, showing the harrow-sections raised and the machine supported entirely upon the carrying-wheels. Fig. 3 is a similar view showing the machine supported upon the harrow-sections and the forward carrying-wheels elevated clear of the ground. Fig. 4 is a longitudinal section through the machine, taken on line 4 4 of Fig. 1. Fig. 5 is a detail perspective view of the operating mechanism for the arched axle. Fig. 6 is a similar view of the operating mechanism for the rock-shaft.

Similar numerals of reference designate corresponding parts in all the figures.

The main frame of the machine is composed, preferably, of a pair of longitudinal frame-bars 10, extending longitudinally of the machine and diverging from their rear toward their forward ends, as clearly shown in Fig. 1. At or near their rear ends said bars are connected by a spacing-block 11, in which is formed a vertical opening 12 for the reception of the swivel post or head 13 of a fork 14, in which is journaled a trailer-wheel 15, which supports the rear end of the main frame and carries the weight of the driver, who occupies the seat 16, supported by means of a suitable standard 17, connected to the rear portion of the main frame. At their forward end the main-frame bars 10 are supported by the central portion of an arched axle 18, which passes through suitable bearings 19, carried by bearing-hangers 19$^a$, having in their rear ends bearings 19$^b$, and which are secured to the under side of the bars 10, as shown in the several figures of the drawings. The central portion of the arched axle is mounted to turn or rock in the bearings 19 and is provided with terminal arms 20, the extremities of which are bent outward or provided with spindles 21, upon which the forward carrying-wheels 22 are mounted. The arms 20 may be of any suitable length and are arranged in parallel relation to each other. Therefore when the shaft portion 18 of the arched axle is turned or rocked in its bearings the wheels 22 are correspondingly raised or lowered, which has the effect of elevating or depressing the main frame of the machine and the harrow-sections connected thereto.

The mechanism for rocking the arched axle consists of a crank-arm 23, arranged at a suitable point on the shaft portion 18 of the arched axle, to which arm is pivotally connected a link 24, which at its opposite end is pivotally connected to one arm of an elbow-lever 25. The opposite arm of said lever has attached thereto a connecting-rod 26, which extends rearward and connects with a hand-operated lever 27 within reach of the driver, said lever being provided with a latch or tooth 28, adapted to engage the teeth 29 of a rack 30, mounted upon one of the frame-bars 10, as clearly shown in Fig. 1. The rear end of the connecting-rod 26 is flattened and provided with a series of holes 31 to receive the bolt which connects said rod with the lever 27, thus enabling the throw of the lever 25 to be regulated for increasing or diminishing the amount of elevation or depression of the forward carrying-wheels. It will thus be seen that the driver by manipulating the lever 27 may raise the wheels clear of the ground and simultaneously depress the harrow-sections which are suspended from the main frame, or vice versa.

In the drawings I have illustrated two harrow-sections 32; but more than two may be employed, if desired. Where two sections are employed, they are arranged at opposite sides of the longitudinal center of the machine and are preferably coupled together by flexible connections 35, so as to limit their relative lateral movement. Each harrow-section consists of any desired number of parallel longitudinal harrow-bars 36, each of which is provided with a series of harrow-teeth 37. All of the harrow-bars are connected by cross-bars 38 and braced by means of diagonal stays 39. Each harrow-section is provided at both sides with upstanding inverted-V-shaped hanger-bars 40, having the opposite lower extremities thereof firmly bolted to the harrow-sections. Extending over each harrow-section is a rock-shaft 41, having terminal arms 42, each of which is provided with a corresponding series of openings 43, thus providing for greater or less throw to the harrow-sections when the rock-shafts are turned. The arms 42 are connected with the hanger-bars 40 by means of detachable pins or bolts 44. Each of the rock-shafts 41 is journaled in bearings 45 and 19$^b$ in the rearwardly-projecting portions of a plurality of bearing-hangers 46 and 19$^a$, having their forward ends provided with bearings 47 and 19, respectively, to receive the arched axle to mount the bearing-hangers thereon. The bearing-hangers 19$^a$, which are located nearest the center of the machine, are connected rigidly with the longitudinal frame-bars 10 of the machine, while the outermost bearing-hangers are also rigidly connected to the main-frame bars 10 by means of braces 48, which extend diagonally or obliquely, as shown in Fig. 1. It is by means of the bearing-hangers 19$^a$ that the main frame of the machine is connected to and supported by the arched axle, and said bearing-hangers therefore form, in effect, portions of the machine-frame. Independent operating mechanism is employed for each of the rock-shafts 41, said mechanism being best illustrated in Fig. 6, in which it is seen to comprise a crank-arm 49, extending downward at an inclination from the rock-shaft and having connected thereto a link 50, which pivotally connects with one arm of an elbow-lever 51, the opposite arm of which has pivotally attached thereto a connecting-rod 52, which extends rearwardly and attaches pivotally and adjustably to a hand-lever 53, similar to that, 27, hereinabove described, said lever being provided with a latch or tooth 54, which engages the teeth 55 of one of a pair of racks 30, mounted upon the main-frame bars 10. The connecting-rod 52, like the other connecting-rod 26, is provided with a series of openings 56, allowing the throw of the lever 51 to be regulated for increasing or diminishing the amount of elevation or depression of the harrow-sections.

From the foregoing description it will be seen that each of the harrow-sections may be elevated or depressed independently of the other and that, if desired, both of the harrow-sections may be correspondingly and simultaneously adjusted up or down. In addition to the adjustment just referred to the operator may raise or lower the forward carrying-wheels to any desired extent, so as to cause the entire weight of the machine to be borne by the harrow-sections, one or both, or borne by the carrying-wheels, it being practicable to raise the harrow-sections sufficiently to enable the machine to be drawn to and from the place of operation. At any time the operator may raise and lower the harrow-sections independently of each other for clearing the teeth from adhering trash without the necessity of dismounting.

It will of course be understood that the harrow hereinabove described is susceptible of changes in the form, proportion, and minor details of construction, which may accordingly be resorted to without departing from the principle or sacrificing any of the advantages of the invention.

Having thus fully described my invention, what I claim as new, and desire to secure by Letters Patent, is—

1. In a sulky-harrow, the combination with a main frame, of bearing-hangers 19$^a$ secured thereto and provided with bearings 19 and 19$^b$, an arched axle journaled in the bearings 19, wheels mounted upon the axle, means for rocking the arched axle, bearing-hangers 46 supported by the arched axle and having bearings 45, brace-rods connecting the hangers 46 to the main frame, rock-shafts journaled in the bearings 19$^b$ and 45, harrow-sections carried by the rock-shafts, and means for raising and lowering the harrow-sections independent of the wheels.

2. In a sulky-harrow, the combination with the machine-frame, of an arched axle connected therewith and having the forward carrying-wheels journaled thereon, bearing-hangers connected with said axle at one end having their opposite ends rigidly connected with the machine-frame, a plurality of harrow-sections suspended beneath the machine-frame, an individual rock-shaft for each harrow-section journaled in the bearing-hangers and pivotally connected with its respective harrow-section, and means for rocking said shaft independently of the movement of the arched axle, substantially as described.

3. In a sulky-harrow, the combination with the machine-frame, and an arched axle forming one of the supports for said frame, of a series of bearing-hangers mounted on the machine-frame and the arched axle, certain of said hangers being connected at the opposite ends directly with the machine-frame and others connected indirectly with the machine-frame by means of interposed braces, individual rock-shafts for each harrow-section journaled in the bearing-hangers, and means for operating each of said individual rock-shafts independently of any movement of the arched axle, substantially as described.

In testimony whereof I affix my signature in presence of two witnesses.

PAUL B. CHRISTENSEN.

Witnesses:
W. WAHRLICH,
J. ANDRESEN.